United States Patent
Chen

(10) Patent No.: US 7,038,907 B2
(45) Date of Patent: May 2, 2006

(54) DRIVE BRACKET WITH MANIPULATIVE LOCKING DEVICE

(75) Inventor: Yun Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/867,983

(22) Filed: Jun. 14, 2004

(65) Prior Publication Data

US 2004/0252452 A1 Dec. 16, 2004

(30) Foreign Application Priority Data

Jun. 13, 2003 (TW) .............................. 92210866 U

(51) Int. Cl.
*H05K 7/14* (2006.01)

(52) U.S. Cl. ........................................ 361/685; 248/694

(58) Field of Classification Search ................ 361/684, 361/685, 726, 727; 248/694; 312/223.1, 312/223.2

See application file for complete search history.

(56) References Cited

U.S. PATENT DOCUMENTS

| | | | |
|---|---|---|---|
| 6,543,866 B1 * | 4/2003 | Chen et al. ............... | 312/223.2 |
| 6,556,434 B1 * | 4/2003 | Chan et al. ................. | 361/685 |
| 6,728,109 B1 * | 4/2004 | Wu ............................. | 361/747 |
| 6,853,547 B1 * | 2/2005 | Williams et al. ............ | 361/685 |
| 2003/0048604 A1 * | 3/2003 | Chen .......................... | 361/685 |
| 2004/0190240 A1 * | 9/2004 | Yeh ............................ | 361/685 |

FOREIGN PATENT DOCUMENTS

| TW | 87204479 | 9/1999 |
|---|---|---|
| TW | 89204144 | 4/2003 |

* cited by examiner

*Primary Examiner*—Anatoly Vortman
*Assistant Examiner*—Corey Broussard
(74) *Attorney, Agent, or Firm*—Wei Te Chung

(57) ABSTRACT

A drive bracket having a locking device for mounting data storage devices (40) therein, includes a first side plate (32), a resilient member (20) fastened to the first side plate, and a turn cap (10) attached onto the resilient member. Two wings (24) extend outwardly and upwardly from the resilient member, and two locking arms (242) extend downwardly from each wing. The turn cap has a pair of pressing portions (128). The turn cap is rotated so that the pressing portions depress the locking arms to extend into through holes (322) of the first side plate of the drive bracket and engage in locking holes (44) of the data storage device, thereby securing the data storage devices to the drive bracket.

18 Claims, 4 Drawing Sheets

DRIVE BRACKET WITH MANIPULATIVE LOCKING DEVICE

BACKGROUND OF THE INVENTION

1. Field of the Invention

The present invention relates to a drive bracket, and particularly to a drive bracket having a locking device for readily assembling or removing a data storage device to or from the drive bracket, and for reducing leakage of electromagnetic waves from the drive bracket.

2. Description of the Related Art

A number of different means and devices are used to mount data storage devices to a drive bracket of a computer enclosure. These data storage devices include, for example, hard disk drives (HDDs), floppy disk drives (FDDs), and compact disk read only memory (CD-ROM) drives. An old conventional means is to directly screw the data storage devices to the drive bracket. An example of this means is disclosed in Taiwan patent application No. 87204479. However, the device disclosed requires a screwdriver, which is unduly cumbersome and time-consuming.

An improved means to overcome the above shortcomings is to have a pair of guide rails attached to opposite side walls of the bracket. A pair of sliding rails is then attached to opposite sides of the data storage device, for sliding in the guide rails of the bracket. Thus, the data storage device can be readily slid into and secured to the bracket. An example of this means is disclosed in Taiwan patent application No. 89204144. However, the rails are between the bracket and the data storage device, and form an enlarged space thereat. This results in increased risk of electromagnetic interference (EMI) originating from the bracket.

Thus, an improved mounting apparatus for data storage devices which overcomes the above-mentioned problems is desired.

BRIEF SUMMARY OF THE INVENTION

Accordingly, an object of the present invention is to provide a drive bracket assembly which readily and securely attaches or removes data storage devices to or from a computer enclosure.

Another object of the present invention is to provide a drive bracket assembly for effectively shielding EMI.

To achieve the above-mentioned objects, a drive bracket assembly in accordance with a preferred embodiment of the present invention is used to mount a data storage device which has a plurality of locking holes on its sidewall, includes a first side plate, a resilient member fastened to the first side plate, and a turn cap attached to the resilient member. Two wings extend outwardly and upwardly from the resilient member, and two locking arms extend downwardly from each wing. The turn cap has a pair of pressing portions. The turn cap is rotated so that the pressing portions depress the locking arms to extend into through holes of the first side plate of the drive bracket and engage in locking holes of the data storage device, thereby securing the data storage devices to the drive bracket.

Other objects, advantages and novel features of the present invention will become more apparent from the following detailed description when taken in conjunction with the accompanying drawings, in which:

DETAILED DESCRIPTION OF THE INVENTION

Figure 1:
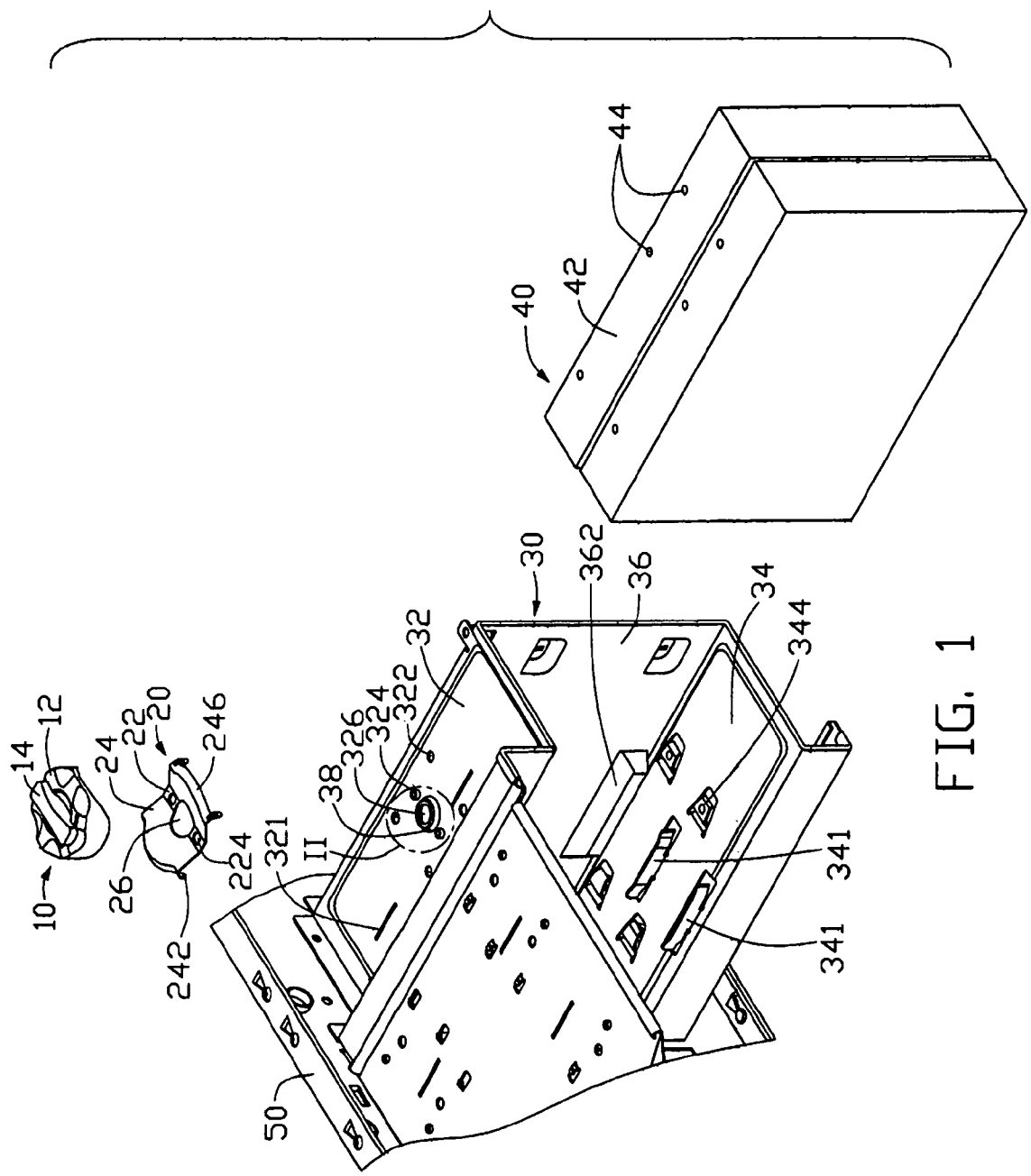
FIG. 1 is an exploded, isometric view of a drive bracket in accordance with the preferred embodiment of the present invention, together with a pair of data storage devices.
Figure 2:
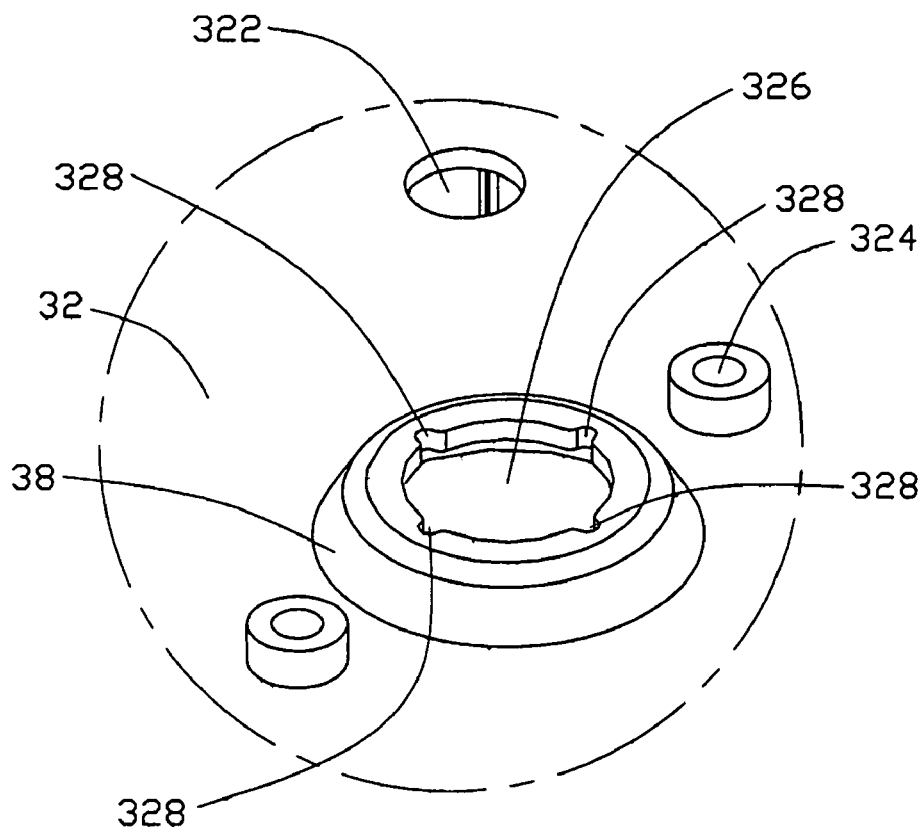
FIG. 2 is an enlarged view of an encircled portion II of FIG. 1.
Figure 3:
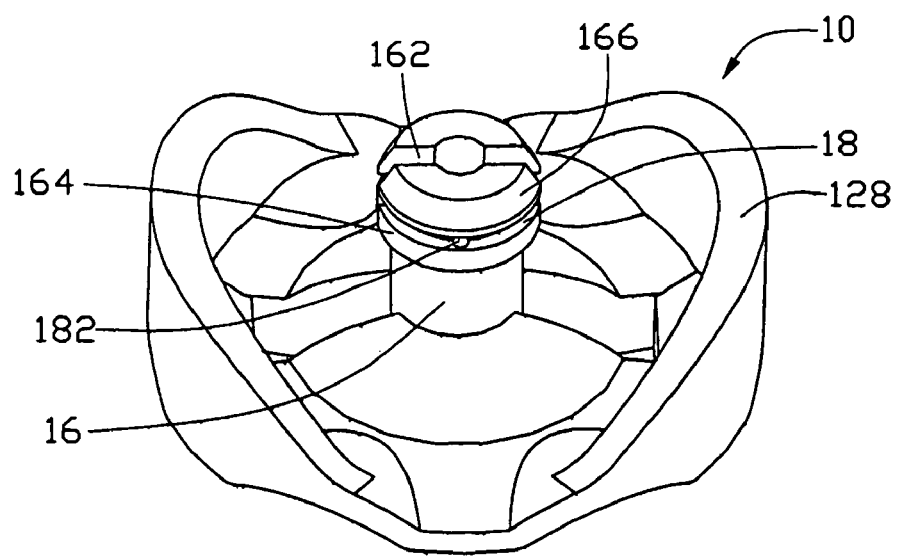
FIG. 3 is an enlarged view of a turn cap of the drive bracket of FIG. 1, but showing the turn cap inverted.

Referring to FIGS. 1–3, a drive bracket 30 in accordance with the preferred embodiment of the present invention is attached to a front panel 50 of a computer enclosure (not shown), and is to accommodate a pair of data storage devices 40 therein. Each data storage device 40 defines a pair of locking holes 44 in one sidewall 42 thereof. A locking device is used to secure the data storage devices 40 in the bracket 30, comprises a turn cap 10 and a resilient member 20.

The bracket 30 comprises a bottom plate 36, and first and second side plates 32, 34 extending from opposite sides of the bottom plate 36. A pair of support projections 362 is stamped inwardly from the bottom plate 36 near the first and second side plates 32, 34 respectively. A plurality of support strips 321, 341 is stamped inwardly from the first and second side plates 32, 34, for supporting and confining the data storage devices 40. A plurality of resilient tabs 344 is stamped inwardly from the second side plate 34.

A bulge 38 is stamped outwardly from the first side plate 32. An opening 326 is defined in a center of the bulge 38. A plurality of notches 328 is defined in an inner periphery of the bulge 38, the notches 328 surrounding and communicating with the opening 326. Two hollow fixing posts 324 are defined in the first side plate 32 at opposite sides of the bulge 38 respectively. Four through holes 322 are defined in the first side plate 32 around the bulge 38.

The resilient member 20 comprises a central engaging section 22, and two wings 24 extending outwardly and upwardly from opposite sides of the engaging section 22 respectively. A through aperture 26 is defined in a center of the resilient member 20. Two fixing apertures 224 are defined in the engaging section 22, at opposite sides of the through aperture 26 respectively. The fixing apertures 224 correspond to the fixing posts 324 of the first side plate 32. Two flanges 246 extend downwardly from lateral free ends of the wings 24, respectively. Two locking arms 242 extend downwardly from opposite sides of each flange 246, corresponding to respective through holes 322 of the first side plate 32.

The turn cap 10 comprises a generally circular base portion 12, an operating portion 14, two curved pressing portions 128, and a pivot axis 16. The operating portion 14 is formed on top of the base portion 12, for facilitating manual operation. The pressing portions 128 extend downwardly from opposite peripheral edge sections of the base portion 12, and are symmetrical to each other. The pivot axis 16 extends downwardly from a center of the base portion 12. The pivot axis 16 forms an enlarged bottom portion 164. An annular groove 18 is defined in the bottom portion 164. A pair of opposite locking protrusions 182 is formed in the groove 18, corresponding to any two opposite of the notches 328 of the bulge 38. A gap 162 is transversely defined in the bottom portion 164, so that the bottom portion 164 is symmetrically bifurcated. The gap 162 provides deformation space for the bottom portion 164. A pair of curved chamfers 166 is defined on a distal end of the bottom portion 164, at opposite sides of the gap 162 respectively. The chamfers 166 facilitate entry of the pivot axis 16 into the bulge 38.

Figure 4:
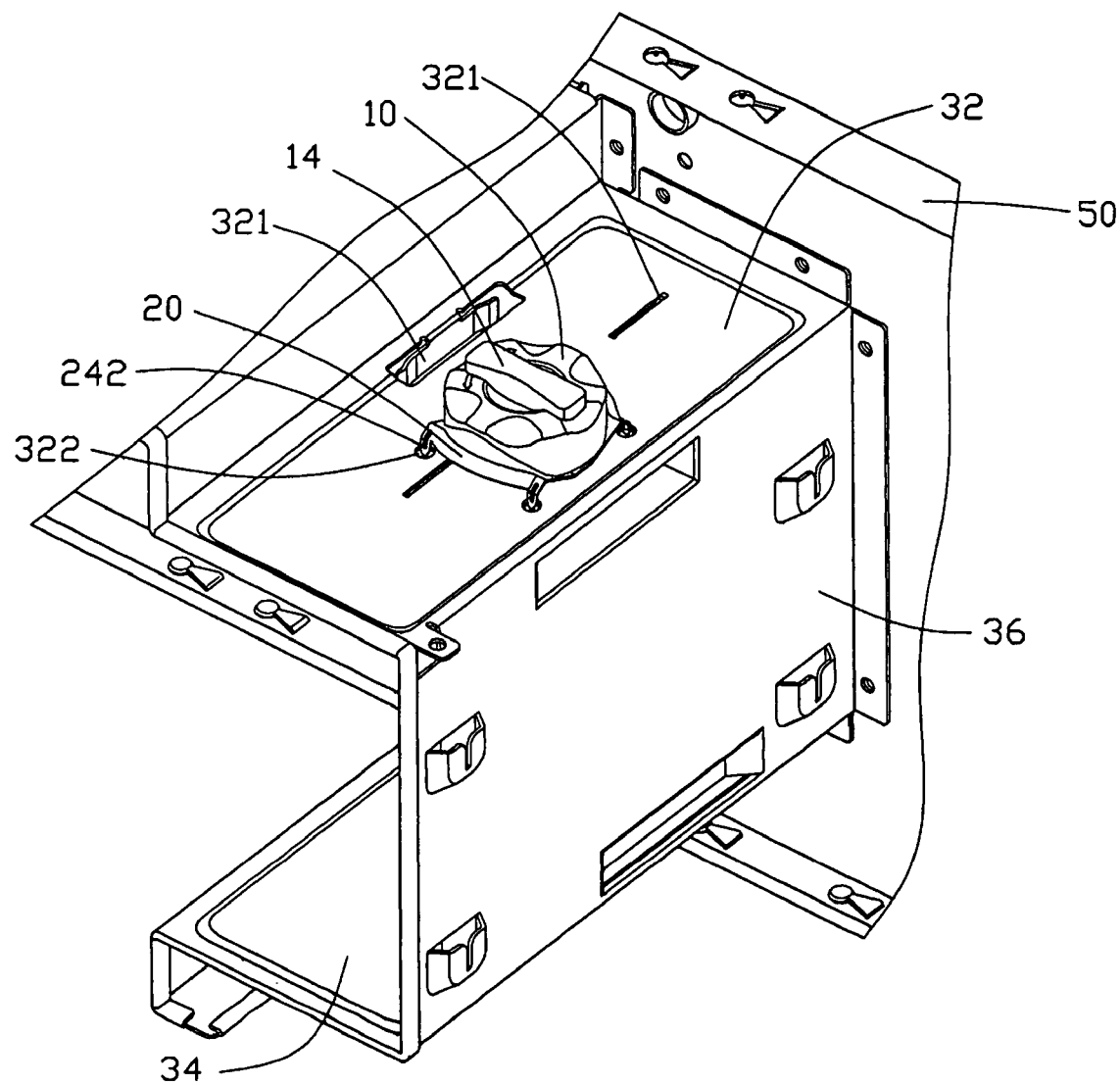
FIG. 4 is an isometric view of the drive bracket of FIG. 1 fully assembled, showing the turn cap at an unlocked position.

Referring also to FIG. 4, in assembly, the resilient member 20 is attached to the first side plate 32. The fixing posts 324 are received through the fixing apertures 224. Two fasteners are inserted into the fixing posts 324 respectively, such that the fixing posts 324 are deformed and engaged on the first side plate 32 at the fixing apertures 224. Other means for fastening the fixing posts 324 in the fixing apertures 224 may alternatively be used. The bulge 38 of the bracket 30 penetrates through the opening 326 of the resilient member 20, with the locking arms 242 of the resilient member 20 being respectively located above the through holes 322 of the first side plate 32. The turn cap 10 is placed onto the resilient member 20, with the pivot axis 16 extending into the through aperture 26 of the resilient member 20 and the opening 326 of the bulge 38. The locking protrusions 182 are aligned with a corresponding pair of notches 328 of the bulge 38. The bottom portion 164 of the pivot axis 16 is deformably passed through the opening 326, with the chamfers 166 facilitating elastic deformation of the bottom portion 164. The bottom portion 164 then rebounds, so that the groove 18 engagingly receives the bulge 38 at the opening 326, with the locking protrusions 182 received in the corresponding notches 328. The turn cap 10 is thus mounted on the first side plate 32 of the bracket 30, and can rotate relative to the bracket 30. The engagement of the bulge 38 in the groove 18 prevents the turn cap 10 from moving in vertical directions.

Figure 5:
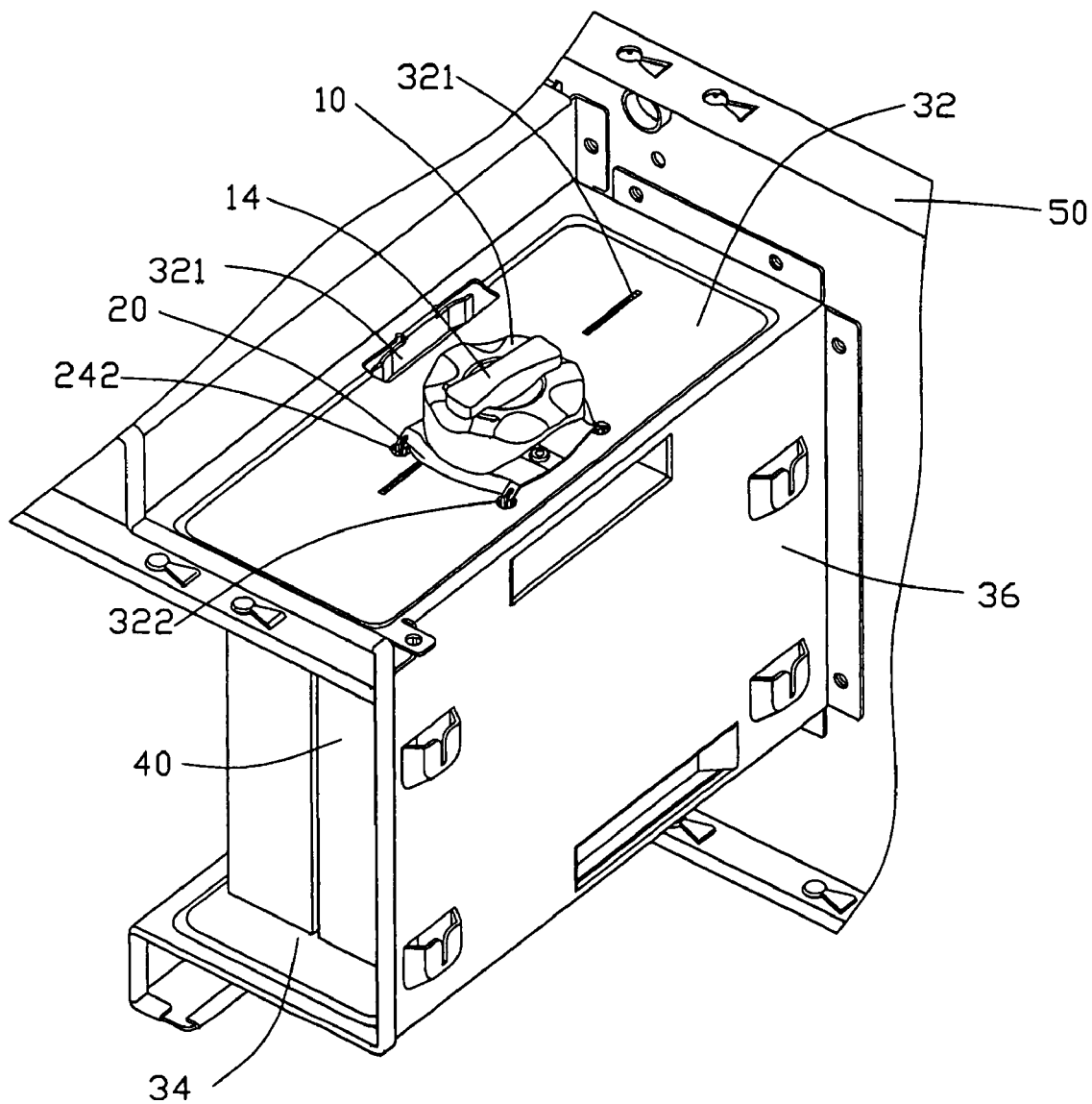
FIG. 5 is a similar to FIG. 4, but showing the turn cap at a locked position.

Referring also to FIG. 5, in use, the data storage devices 40 are slid into the bracket 30, with the locking holes 44 of the sidewalls 42 of the data storage devices 40 being aligned with corresponding through holes 322 of the bracket 30. The resilient tabs 344 support the data storage devices 40, so that the sidewalls 42 abut against the first side plate 32 of the bracket 30. Any space between the data storage devices 40 and the bracket 30 is minimized, thereby efficiently shielding EMI emissions generated from the data storage devices 40. Then the turn cap 10 is rotated 90 degrees in either direction. The pressing portions 128 of the turn cap 10 are thereby rotated onto the wings 24 of the resilient member 20. The wings 24 elastically deform, and depress the locking arms 242 of the resilient member 20 to extend into the through holes 322 of the bracket 30 and the locking holes 44 of the data storage devices 40. The locking protrusions 182 snappingly engage in another pair of opposite notches 328 of the bulge 38. The turn cap 10 thus secures the data storage devices 40 in the bracket 30.

To detach the data storage devices 40 from the bracket 30, the turn cap 10 is again rotated 90 degrees in either direction. The pressing portions 128 of the turn cap 10 are thereby rotated away from the wings 24 of the resilient member 20. The wings 24 rebound to their original positions, and the locking arms 242 withdraw from the through holes 322. The data storage devices 40 are then easily slid out from the bracket 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket assembly adapted for mounting at least one data storage device therein, the drive bracket assembly comprising:

a bracket adapted for accommodating said data storage device, the bracket comprising a bottom plate, and a first side plate and a second side plate extending from opposite sides of the bottom plate, the first side plate defining an opening and a plurality of through holes around the opening;

a resilient member attached to the first side plate of the bracket, the resilient member defining a trough aperture in a center thereof, and two wings extending outwardly and upwardly from opposite sides of the resilient member, at least one locking arm extending downwardly from each of the wings, the locking arms corresponding to the through holes of the first side plate; and a turn cap attached onto the resilient member, the turn cap comprising a pivot post extending trough the through aperture of the resilient member and pivotally engaging in the opening of the first side plate of the bracket, and two pressing portions extending downwardly therefrom;

wherein when the turn cap is in a first position, the pressing portions do not press the wings of the resilient portion, and when the turn cap is rotated to a second position, the pressing portions depress the wings of the resilient portion, the locking arms extend into the through hales of the bracket and engage with said data storage device whereby said data storage device is secured in the bracket.

2. The drive bracket assembly as described in claim 1, wherein the bracket forms a bulge on the first side plate, and the opening is defined in a center of the bulge.

3. The drive bracket assembly as described in claim 2, wherein an inner periphery of the bulge defines a plurality of notches therein, the notches surrounding and communicating with the opening.

4. The drive bracket assembly as described in claim 3, wherein the turn cap comprises a base portion, the pivot post extends downwardly from the base portion, an enlarged bottom portion is formed on an end of the pivot post, the bottom portion defines an annular groove therein, and a plurality of protrusions is formed in the groove.

5. The drive bracket assembly as described in claim 4, wherein the bottom portion defines at least one gap therein, for providing deformation space.

6. The drive bracket assembly as described in claim 1, wherein the resilient member comprises an engaging section, the wings extend outwardly and upwardly from opposite sides of the engaging section, and the engaging section comprises engaging means for securing of the resilient member to the first side plate of the bracket.

7. The drive bracket assembly as described in claim 6, wherein two fixing posts are formed on the first side plate of the bracket at opposite sides of the opening.

8. The drive bracket assembly as described in claim 7, the engaging means comprises two fixing apertures defined in the engaging section and receiving the fixing posts of the first side plate therein.

9. The drive bracket assembly as described in claim 1, wherein two flanges extend downwardly from lateral free ends of the wings respectively, and the at least one locking arm extends downwardly from each of the flanges.

10. The drive bracket assembly as described in claim 1, wherein at least one projection is stamped inwardly from the bottom plate, said projection being adapted to support said data storage device.

11. The drive bracket assembly as described in claim 1, wherein the turn cap forms a portion thereon for facilitating manual operation.

12. A mounting apparatus assembly comprising:
 a bracket adapted to be attached to a panel of a computer enclosure, the bracket comprising a first side plate, the first side piate defining a plurality of through holes;
 at least one data storage device received in the bracket, said data storage device defining a plurality of locking boles in a sidewall thereof;
 a resilient member attached to the first side plate of the bracket, the resilient member forming a plurality of locking arms corresponding to the through holes of the first side plate; and
 a turn cap pivotally attached to the first side plate and located above the resilient member, the turn cap having at least one pressing portion and an axis for rotating said turn cap perpendicular to said first side plate;
 wherein the turn cap rotates between a first position in which said pressing portion depresses the resilient member so that the locking arms of the resilient member are received in the through holes of the first side plate and corresponding locking holes of the sidewall of said data storage device, and a second position in which said pressing portion does not press the resilient member so that the locking arms are retracted from said locking holes of the data storage device.

13. The mounting apparatus assembly as described in claim 12, wherein the turn cap further comprises a base portion, the axis extending from the base portion, the axis has an enlarged bottom portion formed on an end thereof, and the bottom portion defines a circular groove therein.

14. The mounting apparatus assembly as described in claim 13, wherein the bottom portion defines at least one gap therein.

15. The mounting apparatus assembly as described in claim 12, wherein the resilient member comprises an engaging section defining a through aperture defined in a center thereof, two wings extending outwardly and upwardly from opposite sides thereof, and two flanges extending downwardly from ends of the wings, the locking arms extending from the flanges.

16. The mounting apparatus assembly as described in claim 15, wherein the turn cap has two pressing portions, and when the pressing portions are rotated onto the wings of the resilient member, the turn cap is at the first position, and when the pressing portions are rotated away from the wings, the turn cap is at the second position.

17. A mounting apparatus assembly comprising:
 a bracket adapted to be attached to a panel of a computer enclosure, the bracket comprising a side plate defining through holes;
 at least one data storage device received in the bracket, said data storage device defining thereof locking holes in a sidewall and in alignment with the corresponding through hole, respectively;
 a resilient member associatively attached to the side plate of the bracket, the resilient member comprising two wings, each wing forming at least one locking arm corresponding to the through holes of the side plate; and
 a moveable cap associatively attached to the side plate and located above the resilient member, the cap being moveable relative to the bracket between the first and second positions, wherein the cap moves to the first position where said cap depresses the wings of the resilient member so that the locking arms of the wings are received in the through holes of the side plate and corresponding locking holes of the sidewall of said data storage device, and to the second position where said cap does not press the wings of the resilient member so that the locking arms are retracted from said locking holes of the data storage device;
 wherein said cap is rotatably moved relative to the bracket, and an axis of rotation of said cap is perpendicular to said side plate.

18. The mounting apparatus assembly as described in claim 17, wherein the cap further comprises two pressing portions extending therefrom corresponding to the two wings of the resilient member, the resilient member comprises an engaging section, and the two wings extending outwardly and upwardly from opposite sides thereof, the locking arms extending from the wings.

* * * * *